Figure 1:
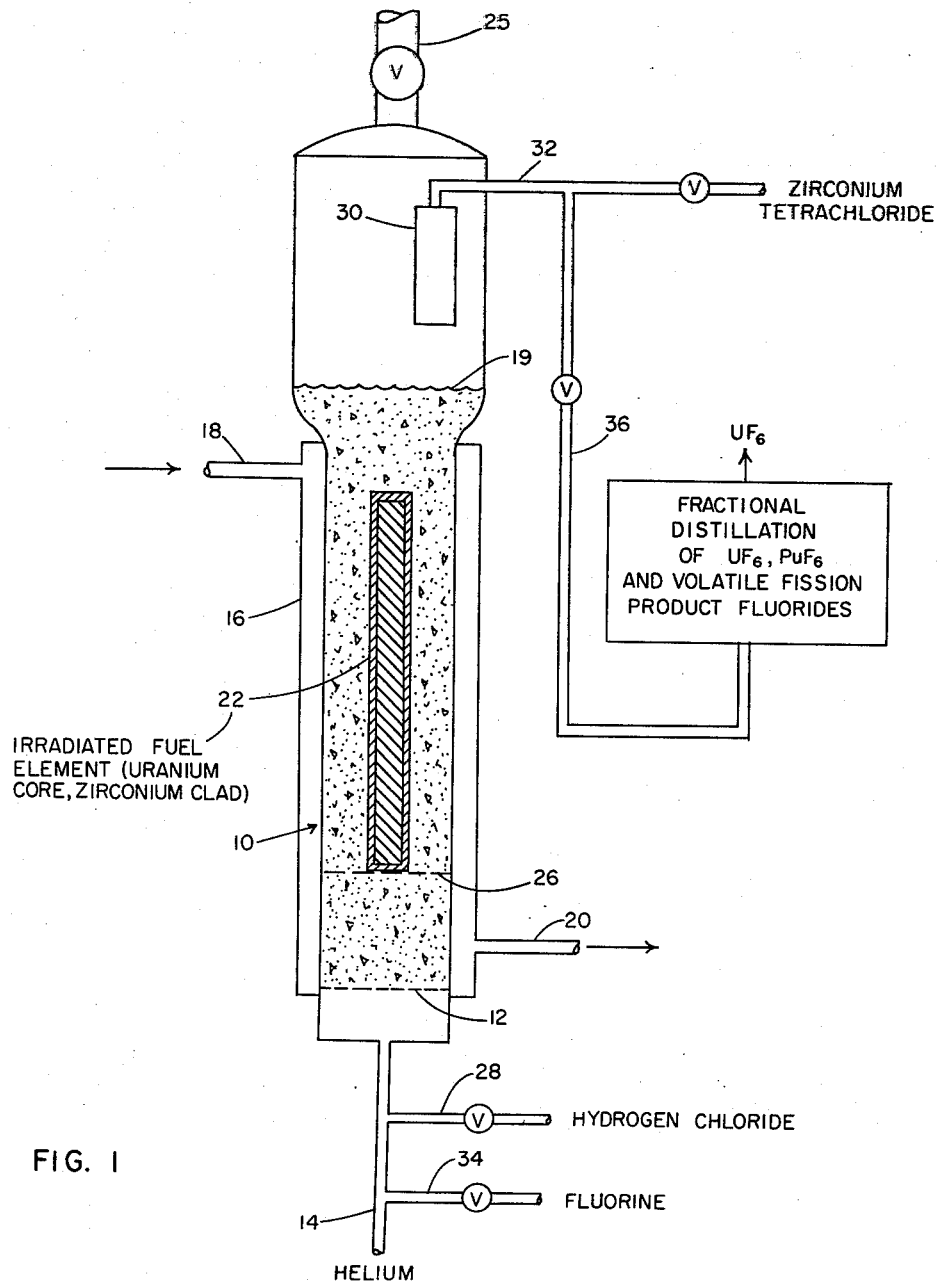

INVENTORS
LORANUS P. HATCH
WILLIAM H. REGAN JR.
JAMES J. REILLY

REACTION RATE vs SURFACE AREA

REACTION RATE vs TEMPERATURE

United States Patent Office 3,149,909
Patented Sept. 22, 1964

3,149,909
FLUIDIZED SOLIDS PROCESS FOR RECOVERY OF URANIUM FROM ZIRCONIUM-TYPE FUEL ELEMENTS
Loranus P. Hatch, Brookhaven, and James J. Reilly, Bellport, N.Y., and William H. Regan, Jr., Rockville, Md., assignors to the United States of America as represented by the United States Atomic Energy Commission
Continuation of application Ser. No. 804,556, Apr. 6, 1959. This application Mar. 27, 1963, Ser. No. 271,543
7 Claims. (Cl. 23—14.5)

The present invention relates to a method for the separation and recovery of uranium from zirconium and the fission products of uranium. More particularly, the present invention is for an improved process for separating uranium from nuclear fuel elements containing uranium and zirconium.

This application is a continuation of our copending application Serial No. 804,556 filed April 6, 1959, now abandoned.

Uranium-bearing solid fuel elements, even when metal clad, have only a limited life as a reactor fuel. One reason for this is that reactor radiation causes extensive physical damage to the elements. Also the burn-up or depletion of the uranium due to fission, non-fission capture by the uranium and its fission products will decrease the reactivity of the reactor, thus necessitating removal of the spent fuel elements. The spent fuel elements still contain an appreciable quantity of uranium which could be reused if the uranium could be economically recovered substantially free of fission products and other contaminants.

Because of its satisfactory nuclear properties and its corrosion resistance at temperatures of the order of 600° F., zirconuim and its alloys have been employed as a clad for reactor fuels such as uranium. Cladding of solid reactor fuels is necessary to prevent oxidation and other corrosive attack of the uranium and to contain radioactivie fission products of uranium. Also, it has been found that when zirconium is alloyed with uranium, it imparts increased mechanical strength and oxidative resistance to the uranium. These desirable properties are counterbalanced by the fact that no completely satisfactory method has yet been developed for the separation of uranium from fuel elements containing zirconium in the clad or as part of the core.

An ideal process for the separation of uranium from zirconium-bearing fuel elements would be one in which the zirconium could be separated from the uranium at an early stage in the process. The separation process should be capable of being carried out at rapid but controllable rates. It is also highly desirable that the volume of radioactive fission product residues of the separation process be held to a minimum.

It is a general object of the present invention to provide a process for separating uranium from a uranium-bearing nuclear fuel element wherein the uranium is mixed with, alloyed with and/or clad with zirconium or its alloys. Another object of the present invention is to provide a method for converting the uranium metal directly to uranium hexafluoride in a controllable manner. A further object of the present invention is to provide a volatilization method of separating zirconium from uranium. Still another object of the present invention is to provide a process for conducting highly exothermic reactions of zirconium and uranium and certain gases such as HCl and $F_2$ at rapid rates and under controllable conditions. A further object is to provide a process for conducting similarly highly exothermic reactions between other metals and gases.

Figure 2:
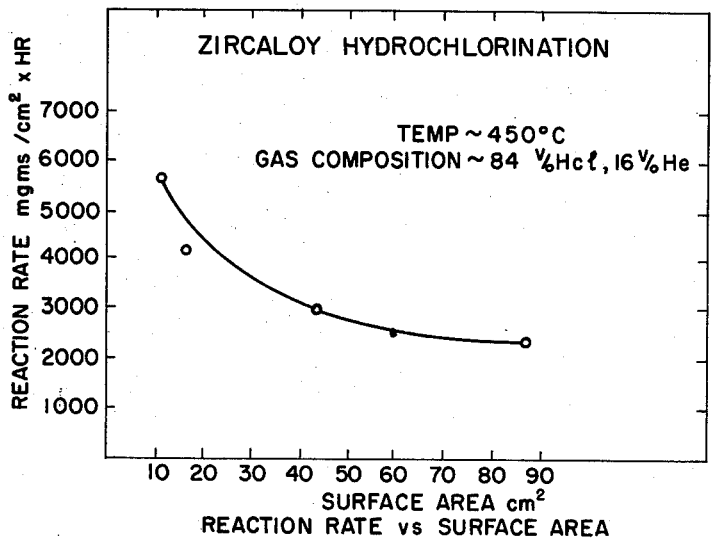
Figure 3:
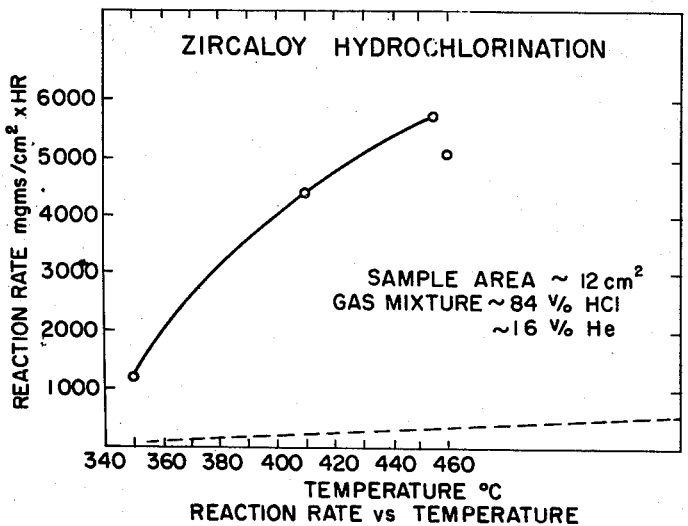

The manner in which these and other objects of the present invention can be achieved will become apparent from the following description taken in conjunction with the accompanying drawings in which: FIGURE 1 is a diagrammatic illustration of an arrangement of apparatus which may be uesd in carrying out the process to be described; FIGURE 2 is a graph showing the variation in reaction rate of hydrochlorinating Zircaloy, a zirconium alloy, with the surface area of the treated sample; and FIGURE 3 is a graph showing the effect of temperature on the reaction rate of the hydrochlorination of Zircaloy.

In accordance with the present invention, uranium is effectively separated from zirconium and other contaminants by an essentially two-step process, each step involving a highly exothermic halogenation reaction carried out in a fluidized solids medium. A zirconium-bearing fuel element in which the fuel is uranium is immersed in a bed of inert, fluidized granular solid and is first contacted with anhydrous gaseous hydrogen chloride at a temperature of about 400° C. When carrying out the reaction in this manner, the bed of fluidized solids serves as an effective heat transfer medium between the substances undergoing reaction and an external coolant circuit. Any momentary or sudden rise in heat evolved is absorbed by the fluidized solids medium to maintain the reaction within safely controlled temperature limits. The gaseous products of this reaction are zirconium tetrachloride and hydrogen. The remainder of the fuel element constituents are left immersed in the fluidized bed after halogenation and consist of uranium and other metal contaminants. The gaseous zirconium tetrachloride and other reaction products are removed from the fluidized bed. The fluidized bed is then heated to a temperature in the range 350° to 450° C., and gaseous fluorine is introduced. At that temperature, the fluorine reacts with the uranium at a rapid and controllable rate to produce gaseous uranium hexafluoride, plutonium hexafluoride and a small percentage of other volatile metal fluorides. The volatile fluorides may then be separated from the bed by well-known fractional distillation techniques.

In the fluidized system used in the present invention, a gas is passed upwardly through a static bed of granular inert solids with sufficient velocity to cause the bed to be held in a state of suspension. In this state of suspension the bed may be said to be fluidized and in such a fluidized bed there is substantially complete disorder and random mixing of the solid and gaseous phases of the suspension. The minimum velocity of the gas is maintained so that the pressure drop across the bed is equal to the weight of the bed plus any frictional forces developed between the solid particles and the walls of its confining chamber.

In a specific embodiment of the present invention to be described, the starting material is a neutron-irradiated fuel element having a uranium core and a zirconium clad. However, it will be understood that the invention is equally applicable to any physical or chemical mixture of uranium with zirconium. In the case of solid fuel elements containing zirconium, the core of the element may be uranium metal, or an alloy of uranium. Zirconium, aluminum, molybdenum and stainless steel are examples of metals which have been alloyed with uranium to form the core of a fuel element.

For a fuller understanding of the present invention, reference is made to FIGURE 1. FIGURE 1, numeral 10 designates a reaction chamber in which the reactions hereinbefore described may be carried out. The reaction chamber should be constructed of a material which can withstand the corrosive action of the halogenating reagents used in, and reactants produced by the process. Nickel and Inconel have been found to be satisfactory materials of construction for this purpose. All valves, seals, gaskets, etc. should be made of a material which is unreactive with the halogenating reagents and reaction products.

The reaction chamber 10 contains a mass of granular solids which rests on a porous plate 12 sealed to the inner wall at the lower end of chamber 10. A gaseous fluidizing medium, under pressure, is introduced into chamber 10 from line 14 which enters the bottom of the reactor. For this purpose, helium, argon or other oxygen-free inert gas may be used. The gas passes upwardly through porous plate 12 and through the bed of solids to create a fluidized bed as previously described. The velocity of the fluidizing gas is controlled so as to create a fluidized mass to about the level indicated at 19 of reaction chamber 10.

The solid phase of the fluidizing medium should be chosen from granular materials which are stable under the prescribed operating conditions. In hydrochlorinating the zirconium such materials as alumina and silica have been found suitable. In fluorinating the uranium, calcium fluoride and other solid inert metal fluorides can be used.

In order to add or extract heat from the fluidized bed, an annular jacket 16 is mounted on the outer wall of chamber 10 in heat exchange relationship therewith and surrounds the zone of fluidized solids in chamber 10. The jacket is provided with an inlet 18 and an outlet 20 for circulating a heat exchange medium therethrough. This heat exchange medium may be a fluid material having a relatively high heat capacity. Air or a liquid metal such as sodium or bismuth can be used as the coolant medium.

In order to support the fuel element within the fluidized bed, a foraminous plate 26 is provided within the zone of fluidized solids in chamber 10. A fuel element 22 of the type described is then lowered into chamber 10 by clamping means not shown from line 25 at the top of the chamber. The element is supported from the bottom by plate 26 and is completely immersed in the fluidized bed. The fluidized bed is then heated to a temperature of 350–450° C. by introducing a heated liquid such as sodium through the jacket 16. The amount of fluidized solids within the reactor 10 should be controlled with respect to the amount of reactants passing therethrough so that any sharp fluctuation occurring during the reaction is transferred to the external coolant circulating through jacket 16 by the fluidized bed with only a minimum change in temperature. As the fluidized bed is heated, the amount of fluidizing gas required to maintain a desired bed expansion varies as the viscosity of the gas increases so that during the heating period the flow rate of fluidizing gas should be controlled to maintain a relatively constant level of fluidized solids surrounding the fuel element 22. When the bed has been heated to the desired temperature, anhydrous hydrogen chloride is then metered from line 28 and thence to line 14 into the reactor 10. The hydrogen chloride reacts with the zirconium of fuel element 22 to produce gaseous zirconium tetrachloride and hydrogen. A small portion of the uranium may be converted to a solid, non-volatile uranium chloride. The gaseous reaction products pass upwardly through the reaction chamber 10 and through a filter 30 in the upper end of chamber 10 to remove entrained solids from the gas. After passing through filter 30, the reaction gases are removed from the system through line 32 and may be treated as required to recover the desired products therefrom.

A number of zirconium samples were treated in accordance with the above described procedure, and in all cases it was found that a high reaction rate was achieved under easily controllable conditions. The results of several experiments are summarized in FIGURE 3 which is a graph showing the reaction rates (in milligrams of sample reacted per square centimeter of sample surface per hour) at temperatures in the range 350° C. to about 460° C. wherein the fluidizing gas consisted of about 84% anhydrous hydrogen chloride and the remainder helium. It will be seen that at these temperatures reaction rates of from 1,000 to 6,000 milligrams per square centimeter per hour were obtained in converting the zirconium to a gaseous zirconium tetrachloride product. Higher reaction rates are achieved at temperatures greater than 460° C. However, for best results the temperature should be kept below 600° C. At a temperature of about 600° C., corrosion of the materials of construction by the hydrogen chloride atmosphere becomes unduly severe. Also the vapour pressure of the uranium compounds produced during the zirconium hydrochlorination becomes significant at this high temperature so that it becomes difficult to obtain a clean separation of the zirconium from the uranium.

As shown in FIGURE 2 the reaction rate has been found to vary with the surface area of the sample. As the surface area increases, the rate of reaction is reduced from a rate of about 5500 milligrams per square centimeter of surface area per hour and settles to a relatively constant rate of about 2500 milligrams per square centimeter of surface area per hour.

In FIGURE 3, the solid curve represents the reaction rates obtained by hydrochlorinating a zirconium sample in a fluidized bed; the dotted curve represents the reaction rates obtainable by conducting the same reaction in the absence of a fluidized bed. Under the latter condition, it will be seen that the reaction rates over the same temperature range as that used in the fluidized bed process differ by a factor of about 30 at 360° C. and by a factor of over 10 at 460° C. In order to achieve comparable high reaction rates without employing the fluidized bed, the reaction would have to be carried out at a temperature of from about 700° C. to over 1,000° C. At these high temperatures, and in the absence of the fluidizing system previously described, the reaction is difficult to control. Moreover, at these high temperatures the uranium reacts with the anhydrous hydrogen chloride to form a volatile uranium chloride product, thus precluding separation of the uranium from zirconium without further processing. In the absence of the fluidized bed it has been found that the zirconium sample reacts rapidly only at localized areas along its surface. When the voluminous gaseous reaction product, zirconium tetrachloride, issues from these local areas of reaction, it surrounds the entire sample. The reaction gases do not have sufficient heat capacity to carry away the heat of reaction. The result is that abnormally high reaction rates obtain at these local areas and produce "hot spots" although the overall reaction rate of the sample is relatively low. By conducting this reaction in a bed of fluidized solids of the kind described hereinbefore, the formation of these localized "hot spots" is averted. The fluidized solids scour the surface of the metal free of any insulating zirconium tetrachloride, thus exposing the entire surface to the action of the chlorinating gas. In addition, the fluidized bed transfers the heat so that reaction over the entire surface proceeds uniformly at a relatively constant rate.

It will therefore be apparent that by conducting the reaction of zirconium with anhydrous hydrogen chloride in a bed of inert fluidized solids, high reaction rates under controlled conditions are obtained to convert the zirconium to a volatile product, thus achieving separation of the zirconium from the uranium.

The residue which remains in the reaction chamber after volatilization of the zirconium has taken place consists of uranium, plutonium and fission products. A highly desirable method for separating the uranium from these contaminants is to form the volatile uranium compound, uranium hexafluoride.

Uranium metal may be directly converted to the hexafluoride by combustion in an atmosphere of fluorine. The reaction between uranium metal and fluorine releases a very large amount of heat, of the order of 2200 kilocalories per kilogram of uranium. It has not heretofore been feasible to remove this amount of heat when generated in a solid-gas reaction. Even for fuel elements where only small amounts of uranium need to be processed, the direct gaseous fluorination to the hexafluoride has proved to be a hazardous and impractical method. The only practical method of producing uranium hexafluoride known heretofore has been by liquid phase reactions in which the heat of reaction is removed by the liquid so as to permit moderately rapid fluorination of the fuel element. By the method of our invention, however, we have been able to fluorinate uranium directly to the gaseous hexafluoride under controllable conditions and at rapid reaction rates.

Reverting to FIGURE 1, in order to separate the uranium from these fission products, the fluidized bed is heated to a temperature of about 400° C. by flowing a heating fluid through jacket 16. When the desired temperature is reached, gaseous fluorine is introduced into reaction chamber 10 from line 34 to convert the uranium therein to the volatile uranium hexafluoride. The concentration of fluorine may comprise from 5% to 100% of the gaseous phase, depending on the rate of reaction desired at any particular temperature. The gaseous reaction product consists of a mixture of uranium hexafluoride, plutonium hexafluoride and other volatile fission product fluorides. This volatile mixture passes upwardly through the reaction chamber 10 and is passed through filter 30 at upper portion of chamber 10 above the fluidized solids to remove entrained solids from the reaction gases. The gases are then removed from reactor 10 through line 32 and line 36 and thence to a distillation zone where the uranium hexafluoride can be fractionally distilled from plutonium hexafluoride and the other fission product fluorides.

A number of uranium samples were fluorinated in reaction chamber 10 as above described. The results are summarized in Table 1 below.

TABLE 1

*Fluidized Bed Fluorination*

| Run No. | Gas Composition | Temperature, ° C. | Overall Reaction Rate, mgm./cm.²/ hr. |
| --- | --- | --- | --- |
| 1 | 5% F₂-95% He | 225 | |
| 2 | 5% F₂-95% He | 300-345 | 310 |
| 3 | 20% F₂-80% He | 350-380 | 550 |
| 4 | 50% F₂-50% He | 400-425 | 1,300 |
| 5 | 50% F₂-50% He | 450-475 | 2,300 |
| 6 | 65% F₂-35% He | 450-475 | 5,400 |

It will be noted that appreciable reaction rates did not occur until a temperature in the range of 400° to 425° C. was reached with a gaseous mixture containing 50% by volume fluorine. The reaction rates then increased sharply at a temperature in the range 450°–475° C.; with a slight increase in fluorine concentration, a reaction rate of 5400 mgm./cm.² per hour was achieved. The rate of reaction at a given temperature has been found to increase with increasing concentration of fluorine. As the temperature of the fluidized bed increases, the reaction rate will also increase. However, for practical purposes, the reaction should not be permitted to attain a temperature of about 600° C. As in the case of hydrochlorination of zirconium, the halogenating atmosphere corrodes the materials of construction excessively at higher temperatures.

The hydrochlorination of the zirconium and the fluorination of uranium in my novel process can be effectuated sequentially in the same chamber merely by providing means for entrance and removal of the gaseous reactants and reaction products found usable in my process provided means for doing same are provided in the apparatus in which the process is carried out. FIGURE 1 clearly illustrates such an apparatus.

When conducting the same reaction in the absence of a fluidized bed of the type described, comparable reaction rates can only be achieved at much higher temperatures and only at the risk of "run away" and/or under potentially explosive conditions. As in the case of hydrochlorination of zirconium, a voluminous gaseous reaction product—in this case uranium hexafluoride—issues from localized areas of reaction and covers the remaining surface areas, thus providing an insulating layer which reduces the surface area of the metal available for reaction with the gaseous halogenating reagent. The result is ignition of the sample with extremely high reaction rates at localized areas of the sample surface but relatively low overall rates of reaction and under difficultly controllable conditions.

One reason for the improved control of this highly exothermic reaction is provided by a measure of the heat transfer coefficient obtainable between the reacting sample and the fluidized bed. In accordance with our invention we attain a heat transfer coefficient between the reacting solid surface and the fluidized bed of about 400 B.t.u./ft.² of sample area per hour per ° F.; in the absence of the fluidized bed the heat transfer coefficient between the reacting solid and the surrounding atmosphere has been calculated to be of the order of 10 B.t.u./ft.² per hour per ° F. over the same temperature range.

In view of the above, it will now be apparent that by the present invention an improved method is provided for separating uranium from a composition containing uranium and zirconium.

A particular advantage of the present invention is that high reaction rates are achieved at temperatures at which "run away" and potentially hazardous conditions are minimized. Also, a process is provided wherein uranium is separated from zirconium and fission products as a pure volatile product suitable for further use as a reactor fuel or for other purposes.

A further advantage of the present invention is that upon processing irradiated fuel elements in accordance with this invention most of the fission products previously associated with the fuel will remain in the inert bed and in an essentially pure form so that they can be readily recovered for subsequent utilization or disposal.

In its broader aspects the present invention has particular utility in conducting highly exothermic solid-gas reactions at practical rates of conversion, and under controllable conditions. As an example, consider the reaction of gaseous fluorine with metallic silicon at room temperature. Under these conditions the reaction will proceed violently and under potentially hazardous conditions to form gaseous silicon tetrafluoride. Yet, when this same reaction is carried out in a fluidized bed in heat exchange relationship with an external coolant, the same reaction can be carried out under controllable conditions and at room temperature. Furthermore, the reaction will proceed smoothly and at practical reaction rates.

Additional examples of highly exothermic reactions which can be carried in a controllable manner in accordance with the method of our invention are given in Table 2 below. The approximate reaction temperature range given in the table is the temperature at which the particular reaction may be carried out in a smooth and controllable manner.

*Table 2*

| Reaction | Kilocalories per kilogram (of metal) | Approximate reaction temperature range, ° C. |
| --- | --- | --- |
| Hf+2Cl₂→HfCl₄(g) | 1,300 | 250-450 |
| Al+3/2Cl₂→AlCl₃(g) | 5,650 | 250-350 |
| Sn+2Cl₂→SnCl₄(g) | 1,000 | 250-550 |
| B+3/2H₂→BH₃(g) | 25,000 | (¹) |
| Si+2F₂→SiF₄(g) | 13,200 | (¹) |
| Si+2Cl₂→SiCl₄(g) | 5,120 | 200-300 |
| Mo+3F₂→MoF₆(g) | 4,160 | 100-200 |
| Nb+5/2F₂→NbF₆(g) | 4,900 | 300-400 |
| Pu+F₂PuF₆(g) | 1,880 | 250-350 |
| Be+Cl₂→BeCl₂(g) | 8,130 | 500-600 |
| Cr+2Cl₂→CrCl₄(g) | 1,920 | 250-350 |

¹ Room temperature.

Since many embodiments might be made of the present invention and since many changes might be made in the embodiment described, it is to be understood that the foregoing description is to be interpreted as illustrative only and not in a limiting sense.

We claim:

1. In a process for the recovery of uranium from uranium bearing zirconium clad nuclear fuel elements wherein said zirconium is reacted with, volatilized and removed from the element by contacting said element with anhydrous hydrogen chloride and thereafter the uranium in said element is reacted with, volatilized and removed from the element by contacting the unclad element with gaseous fluorine, the improvement comprising the step of immersing said element in a bed of inert fluidized granular solid while carrying out the removal of the zirconium from the clad element.

2. The process of claim 1 wherein the temperature of said bed is maintained at a temperature of about 400° C. during the removal of the zirconium from the element.

3. In a process for the recovery of uranium from uranium bearing zirconium clad nuclear fuel elements wherein said zirconium is reacted with, volatilized and removed from the element by contacting said element with anhydrous hydrogen chloride and thereafter the uranium in said element is reacted with, volatilized and removed from the element by contacting the unclad element with gaseous fluorine, the improvement comprising the step of immersing said element in a bed of inert fluidized granular solid while carrying out the removal of said uranium from the unclad element.

4. The process of claim 3 wherein the temperature of said bed is maintained at a temperature ranging from about 350° C. to about 450° C. during the removal of the uranium from the element.

5. In a process for the recovery of uranium from uranium bearing zirconium clad nuclear fuel elements, wherein said zirconium is reacted with, volatilized and removed from the element by contacting said element with anhydrous hydrogen chloride and thereafter the uranium in said element is reacted with, volatilized and removed from the element by contacting the unclad element with gaseous fluorine, the improvement comprising the step of immersing said element in a bed of inert fluidized granular solid while carrying out the removal of the zirconium and the uranium from the element.

6. In a process for the recovery of uranium from uranium bearing zirconium clad nuclear fuel elements wherein said zirconium cladding is reacted with, volatilized and removed from the element by contacting the clad element with anhydrous hydrogen chloride and thereafter the uranium contained in the element is reacted with, volatilized and removed from the element by contacting the unclad element with gaseous fluorine the improvement comprising the steps of immersing the clad element in a bed of inert fluidized granular solid, wherein said contacting of the clad fuel element with anhydrous hydrogen chloride is carried out at a temperature of about 400° C. and said contacting of the immersed unclad element is carried out at a temperature ranging from about 350° C. to about 450° C., thereafter recovering the uranium from the volatilized reaction product of uranium and fluorine.

7. In a process for the recovery of uranium from uranium bearing zirconium clad nuclear fuel elements wherein said zirconium cladding is reacted with, volatilized and removed from the element by contacting the clad element with anhydrous hydrogen chloride, the step comprising scouring the surface of the metal free of insulating zirconium tetrachloride with fluidized solids during said contacting with said hydrogen chloride.

References Cited in the file of this patent

UNITED STATES PATENTS

| 2,400,176 | Thiel | May 14, 1946 |
| 2,811,414 | Murphree | Oct. 29, 1957 |

OTHER REFERENCES

AEC Document TID-7534, May 1957, pp. 253 and 254.

Proceeding of the Second U.N. International Conference on the Peaceful Uses of Atomic Energy, Sept. 1–13, 1958, vol. 4, pp. 44–57, and vol. 17, pp. 465 and 485–491.